United States Patent [19]

Gawron et al.

[11] 4,007,795

[45] Feb. 15, 1977

[54] ATTACHMENT FOR A ROTARY-HAMMER TOOL

[75] Inventors: Alex F. Gawron; William E. Dillon, both of Chicago, Ill.

[73] Assignee: Skil Corporation, Chicago, Ill.

[22] Filed: Feb. 13, 1976

[21] Appl. No.: 658,029

[52] U.S. Cl. .................................. 173/50; 299/91; 145/66; 175/414

[51] Int. Cl.$^{2}$ .................................. A01B 33/00

[58] Field of Search ........................ 173/50, 47, 48; 175/414, 415, 382; 299/69, 91; 408/700, 713; 145/66

[56] References Cited

UNITED STATES PATENTS

| | | | |
|---|---|---|---|
| 751,345 | 2/1904 | Saunders | 143/66 |
| 3,336,081 | 8/1967 | Ericsson | 299/91 |
| 3,403,738 | 10/1968 | Burkhart et al. | 173/48 |
| 3,519,309 | 7/1970 | Engle et al. | 299/91 |
| 3,655,244 | 4/1972 | Swisher | 299/91 |
| 3,690,390 | 9/1972 | Chromy | 175/414 |

FOREIGN PATENTS OR APPLICATIONS

| | | | |
|---|---|---|---|
| 1,197,881 | 9/1967 | United Kingdom | 299/91 |

*Primary Examiner*—Robert A. Hafer
*Attorney, Agent, or Firm*—McDougall, Hersh & Scott

[57] ABSTRACT

A power tool includes manually operated selector means for alternately establishing rotary-hammer and hammer-only modes of operation for the associated drill bit. The attachment is in the form of an elongated member having a longitudinally extending blind bore for receiving the drill bit; retaining means are provided for releasably mounting the attachment on the drill bit. An annular shoulder defining the mouth of the blind bore is in abutting engagement with another annular shoulder, the latter being arranged to receive impact blows from the hammer mechanism of the power tool. In one embodiment, this second mentioned annular shoulder is constituted by a tappet forming part of the hammer mechanism. In another embodiment, this second mentioned annular shoulder is an integral part of the drill bit. Impact blows are transmitted to the attachment only through the area of engagement of the aforesaid annular shoulders. In one embodiment, the attachment has its working end in the form of a blunt end cylinder adapted to install concrete anchors. In another embodiment, the working end of the attachment is in the form of a chisel.

16 Claims, 8 Drawing Figures

ATTACHMENT FOR A ROTARY-HAMMER TOOL

BACKGROUND OF THE INVENTION

1. Field of the Invention

The field of the invention relates to attachments for portable power tools. More particularly, the field of the present invention relates to attachments for power tools of the type which have rotary-hammer mechanisms and selector means for alternately establishing rotation (with or without combined hammering) and hammering-only modes of operation. Such power tools use a drill bit and are particularly suited for drilling holes in concrete, for example.

2. The Prior Art

Power tools of the type here under consideration are powered by either an electric or pneumatic motor and include so-called rotary-hammer mechanisms. In certain of these tools, one mechanism is capable of imparting combined rotation and axial impact blows to a tool element, such as a drill bit. These tools include a manually operable selector lever for engaging and disengaging the rotation imparting mechanism thereby to provide a hammer-only mode of operation. Representative power tools of this type are disclosed in U.S. Pat. Nos. 3,837,409 and 3,845,826, both assigned to the assignee of the present application.

One well known use of these power tools is for installation of concrete anchors. When it is desired to install such an anchor, the power tool is operated in the combined rotation and hammering mode of operation thereby rapidly to drill a hole in a concrete structure. Thereafter, the drill bit is removed and replaced by an attachment particularly adapted for driving the slugs forming part of these concrete anchors. After this attachment is secured to the tool, the selector lever is actuated such that the power tool will impart hammer-only blows to the attachment thereby to hammer the anchor slug in place. Thus, when installing a number of concrete anchors, it is necessary repeatedly to detach and attach both the drill bit and the separate anchor installing tool. This is a rather time consuming task and requires the use of two completely separate tool elements.

Operators of these power tools often find it necessary to perform chiseling work during the course of drilling in a concrete structure, for example. In carrying out this type of work, it is necessary for the operator to make frequent changes to the tool elements. That is to say, he must frequently remove the drill bit, replace it by a chiseling tool element, and then later reinsert the drill bit. This is a rather time consuming operation and requires again two separate and independent tool elements.

SUMMARY AND OBJECTS OF THE INVENTION

The present invention may be summarized as relating to an attachment which is readily mounted on a drill bit (secured to a powered rotary-hammer of the type described) for performing a hammering type operation without the necessity of removing the drill bit from the power tool.

A primary object of the present invention is the provision of a new and improved attachment for a rotary-hammer tool, which attachment is capable of being releasably mounted on a drill bit for efficiently performing a hammering operation and for obviating removal of the drill bit from the power tool.

Another object of the present invention is the provision of an attachment of the type described which may be readily attached to and removed from the drill bit by improved retaining means which also serve as a convenient grip to facilitate manual handling of the attachment.

These and other objectives of the present invention will become apparent from the following specification disclosing preferred embodiments shown in the accompanying drawings.

DESCRIPTION OF THE PREFERRED EMBODIMENTS

Figure 1:
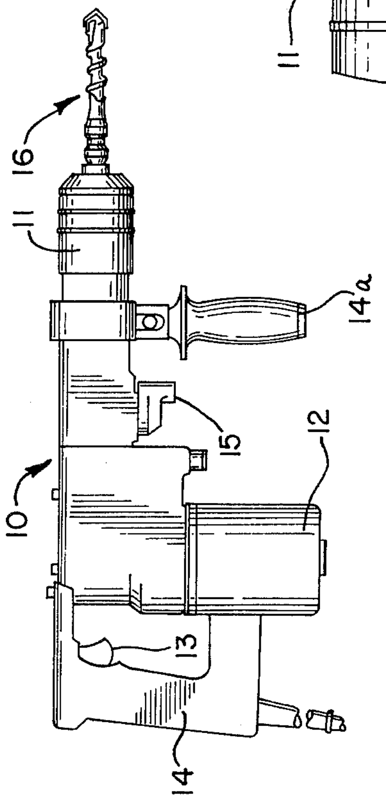
FIG. 1 is a side elevational view of a powered rotary-hammer tool with which the present invention is utilized.

Referring particularly to FIG. 1, a powered rotary-hammer tool is generally designated 10. It will be understood that such tool includes a rotary-hammer mechanism of the type described in the aforementioned U.S. patents.

The power tool 10 includes a housing portion 11 which contains the hammering mechanism and the rotation imparting mechanism. The particular tool illustrated is powered by an electric motor contained within the housing portion 12, which motor may be energized by depressing a trigger 13 mounted from the handle 14. An auxiliary handle 14*a* is provided to facilitate handling of this portable power tool. The tool 10 includes a lever 15 for selectively engaging and disengaging the rotary mechanism and is more fully explained in the aforementioned U.S. patents. It will be understood that the present invention may also be advantageously used with powered tools of the type adapted to provide rotation-only as well as combined hammering and rotation and hammering-only modes of operation.

Figure 8:
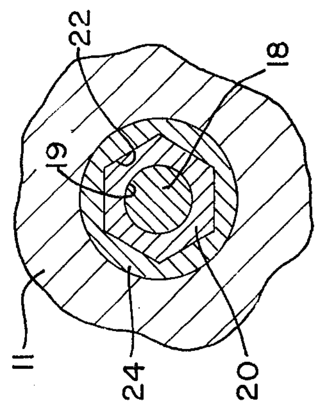
FIG. 8 is a section taken along the line 8—8 of FIG. 7.
Figure 7:
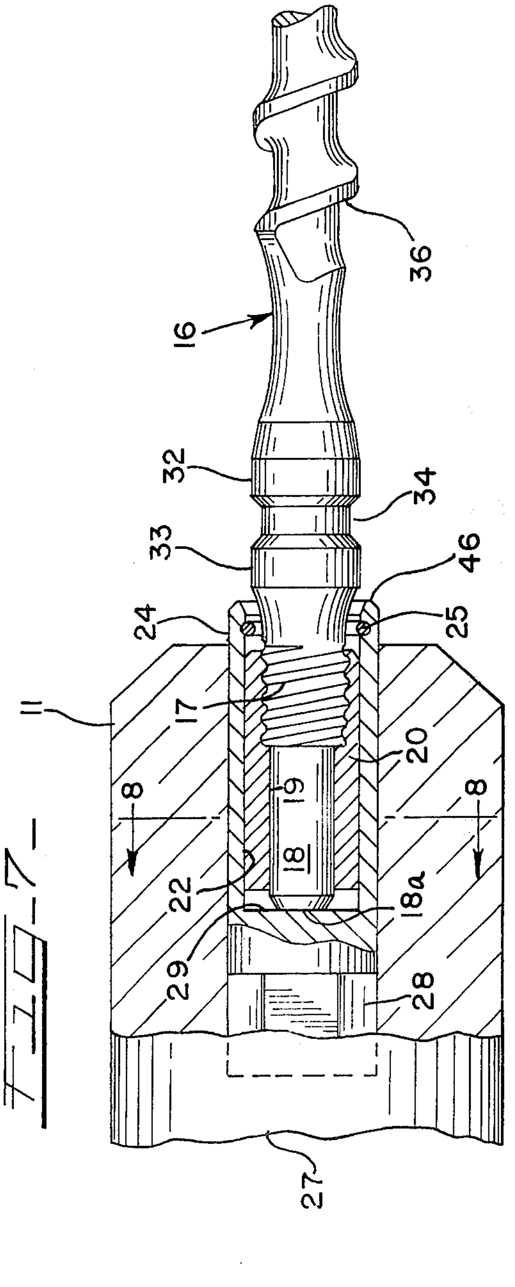
FIG. 7 is an enlarged view, partly a longitudinal section and side elevational view, showing the manner in which the drill bit is attached to the power tool.

A drill bit, generally designated 16, is shown connected with the power tool 10. Referring to FIG. 7, the drill bit 16 includes a shank portion defined by a threaded section 17 and a cylindrical section 18. The threads are threadingly engaged with the threaded portion of a bore 19 formed within a nut 20. The nut 20 is received within a blind bore 22 formed in a tappet 24, which bore has a hexagonal cross-section as illustrated in FIG. 8. A retaining ring 25 is provided to prevent separation of the nut 20 from the bore of the tappet 25.

It will be understood that the tappet 24 receives impact blows from the striker or hammer of the power tool 10. To this end, the tappet 24 is provided with a flat surface 27 which is struck by the face of the hammer or striker (not shown). The tappet is provided with an external hexagonal formation 28 at the inner end thereof. It will be understood that this hexagonal formation is received within a correspondingly shaped member (not shown) which rotates and which of course forms part of the rotary mechanism of the power tool.

It is noted that the cylindrical portion 18 of the drill bit 16 has a flat surface 18*a* at the distal end thereof which abuts the base 29 of the blind bore 22. Thus, impact blows received by the tappet longitudinally thereof from the hammering mechanism are transmitted to the drill bit 16 longitudinally of the latter through the area of engagement between the surfaces 18*a* and 29.

It will be understood that the threads 17 on the drill bit and the threads in the bore 19 are arranged such that rotation of the tappet 24 will be imparted to the drill bit 16. Of course, the drill bit 16 is separated from the tool by rotating the drill bit in the other direction thereby to disengage the threads 17 from the threads in the bore 19.

Figure 2:
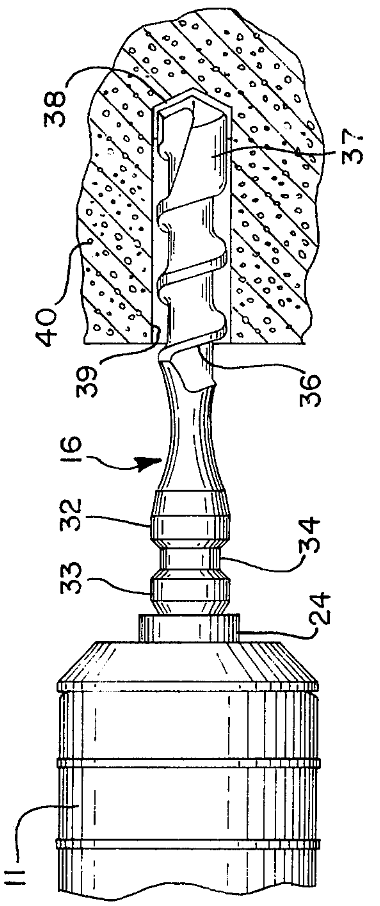
FIG. 2 is an elongated side elevational view primarily showing a drill bit forming a hole in a section of concrete.

Referring particularly to FIG. 2, the drill bit 16 has a pair of annular formations 32, 33 defining an annular recess 34. The drill bit includes a flute 36 terminating in a tip formation 37. This tip is provided with a diametrically disposed slot for receiving the usual tungsten carbide bit element 38. In FIG. 2, the drill bit 16 is shown as having drilled a hole 39 in a section of concrete 40.

Figure 3:
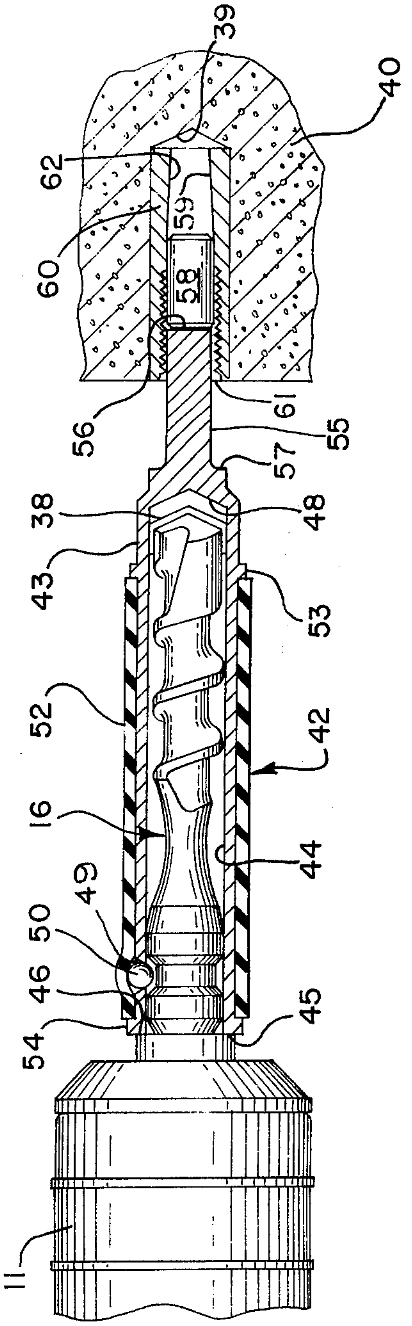
FIG. 3 is a partial side elevational view and partial longitudinal section showing the attachment of the present invention in the form of a device for driving slugs forming part of concrete anchors.
Figure 4:
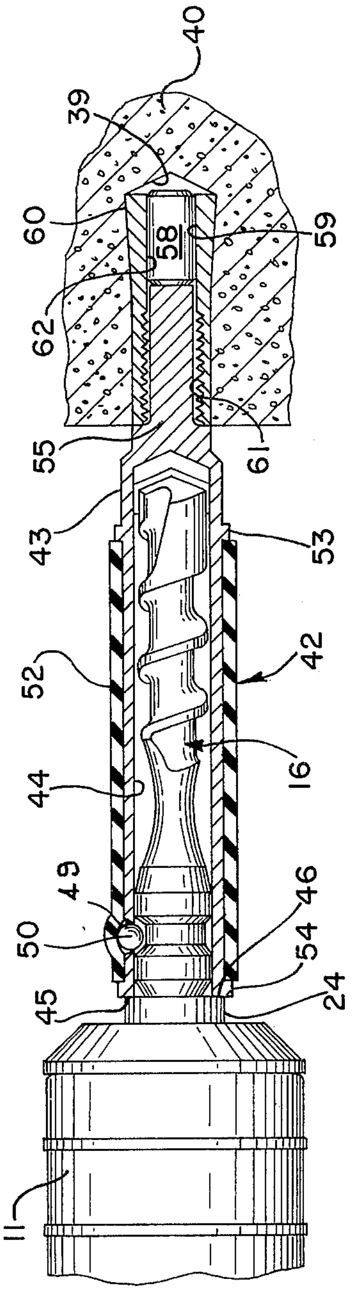
FIG. 4 is a view similar to FIG. 3, but showing the anchor slug after it has been fully driven in place.

Referring now to FIGS. 3 and 4, the attachment of the present invention, generally designated 42, includes an elongated member or body 43 circular in cross-section and provided with a blind bore 44 for receiving the drill bit 16. The mouth of the blind bore is defined by an annular shoulder 45 in abutting engagement with an annular shoulder 46 formed on the outer end of the tappet 24. It will be noted from FIGS. 2 and 3 that the forward end of the tappet projects from the nose portion of the housing 11 of the power tool; consequently, the annular shoulder 46 is readily accessible from the exterior of the power tool.

Impact blows from the tappet 24 are transmitted to the attachment 42 only through the area of engagement of the annular shoulders 45, 46. In this regard, it is noted that the base 48 of the bore 44 is in spaced relationship with the bit element 38. Thus, the attachment 42 will not be damaged in any manner nonwithstanding the fact that the impact blows are transmitted simultaneously to the attachment and the drill bit.

A cavity 49 is formed in the wall of the body portion 43, which cavity communicates with both the blind bore 44 and the exterior surface of the body portion of the attachment 42. A ball 50 is received within the cavity 49. This cavity defines an opening in the wall of the bore 44 having a diameter less than the diameter of the ball 50 but sufficiently large to permit a portion of the ball to project within the blind bore 44 for being received within the annular recess 34 in the drill bit 16. A rubber sleeve 52 is snugly fitted on the exterior surface of the body portion 43 of the attachment. This sleeve engages the ball 50 and urges the same inwardly of the blind bore 44.

Thus, the ball 50 urged inwardly by the adjacent portion of the rubber sleeve 52, acts as a retainer for releasably securing the attachment 42 to the drill bit 16. The rubber sleeve 52 extends longitudinally of the body portion 43 to a substantial extent and serves as a gripping element to facilitate manual handling of the attachment 42. The body portion 43 is preferably provided with a pair of annular ribs 53, 54; these ribs are abutted by opposite ends of the sleeve 52 to aid in holding the latter in place.

The attachment 42 shown in FIGS. 3 and 4 has the working end thereof in the form of a reduced-in-diameter cylindrical portion 55, the latter terminating in a blunt end 56. The attachment 42 is especially adapted for driving an anchor slug 58 into the bore 59 of an anchor sleeve 60. This anchor is the drop-in type, such as the Redhead MultiSet manufactured by ITT Phillips Drill Company, or Series HDI manufactured by Hilti Fastening Systems, or the Bulldog Anchor manufactured by Ramset Fastening Systems, a division of Olin Corporation. The bore 59 includes an internally threaded portion 61 and a frusto-conical portion 62. When the slug 58 is driven into the frusto-conical portion 62, the inner end of the anchor sleeve is expanded for securing such anchor in the concrete formation 40. The attachment 42 has an annular shoulder 57 which engages the outer end of the anchor sleeve 60 as the slug 58 is fully driven in place.

In the use of the embodiment of the invention shown in FIGS. 3 and 4, the drill bit 16 is attached to the power tool 10 and the selector lever 15 is actuated to provide the combined hammering and rotation mode of operation. The power tool is energized and the hole 39 is formed in the concrete section 40 by this combined drilling and hammering action. The anchor 60 is then manually inserted within the bore 39. Next, the attachment 42 is quickly mounted on the drill bit by sliding the former into place and allowing the ball 50 to snap into the annular space 34. The selector lever 15 on the power tool is then actuated to bring about the hammer-only mode of operation. Thus, the slug 58 may be quickly hammered into the bore portion 59 of the anchor sleeve thereby expanding the inner end of the latter for securing the anchor sleeve in place. If it is now desired to drill another hole preparatory to placement of another anchor, the attachment 42 is quickly slipped off the drill bit 16 and the selector lever 15 actuated to bring about the combined hammering and rotation mode of operation.

Therefore, it is apparent that according to the present invention the powered rotary-hammer may be quickly converted to perform a hammering function from a drilling function merely by actuating the selector lever 15 and by mounting the attachment 42 on the drill bit. Thus, it is not necessary in achieving these functions to engage in the time consuming task of removing the drill bit as is the case with prior art systems. With the use of the present invention, it is possible to set concrete anchors in approximately half the time required to set such anchors using tools known in the prior art.

Figure 5:
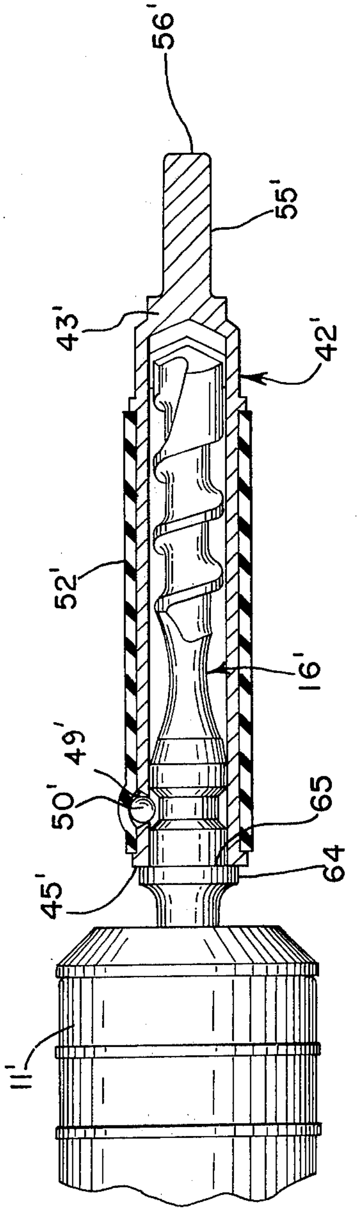
FIG. 5 is a partial side elevational view and partial longitudinal section showing the attachment mounted on a drill bit having a configuration different from the drill bit of FIGS. 2 and 4.

The present invention may also be used with power tools which do not have a portion of the hammering mechanism, such as the tappet, accessible from the exterior of the power tool. When using such powered rotary-hammers, it is preferable to use a drill bit of the type shown in FIG. 5 wherein the various parts corresponding to the parts already described are indicated by the prime form of numeral.

The drill bit 16' includes an annular formation 64 defining a forwardly facing annular shoulder 65. This annular shoulder is in abutting engagement with the annular shoulder 45' on the attachment 42' thereby to transfer the impact blows to the attachment through the area of engagement of the annular shoulders 45', 65.

As mentioned in the introductory portion of this specification, it is often desirable, when using rotary-hammers of the type here under consideration, to be able to perform drilling and chiseling operations alternately and in rapid succession. Another embodiment of the present invention permits these operations without the necessity of removing the drill bit from the power tool. This embodiment is shown in FIG. 6 wherein the parts corresponding to the parts already described are indicated by the double prime form of numeral.

Figure 6:
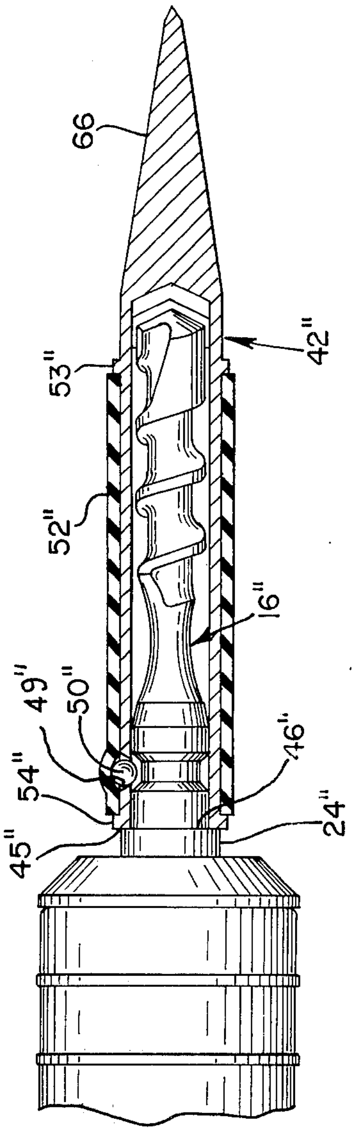
FIG. 6 is a partial side elevational view and partial longitudinal section showing the attachment of the present invention in the form of a chisel.

Referring to FIG. 6, the attachment 42'' has the working end thereof in the form of a chisel formation 66. Thus, this attachment may be readily attached to the drill bit 16'' merely by sliding the former over the latter until the retainer ball 50'' snaps into place. Consequently, when it is desired to perform some chiseling work after drilling a hole, it is necessary only to actuate the selector lever 15 and to mount the attachment 42'' in place, thus obviating the more time consuming step of removing the drill bit 16''.

Accordingly, it will be seen that the present invention provides a new and improved attachment for ready mounting on a drill bit to perform a special or desired type of hammering operation without the necessity of removing the drill bit from the power tool. It will be understood that the present invention may be used with a variety of power hammers, both of the rotary and non-rotating type.

We claim:

1. An attachment in combination with a power hammer and an associated drill bit, said hammer being of the type including a powered hammering mechanism, said hammer having a nose portion adjacent an opening arranged to receive the shank portion of said drill bit when the latter is operatively attached to the power hammer, a first formation adjacent said nose portion and accessible from the exterior of said hammer, said first formation being connected with said hammering mechanism such that the former receives impact blows developed by the latter, said attachment comprising, an elongated member having a longitudinally extending bore communicating with at least one end of said member thereby to receive said drill bit, said elongated member having a second formation adjacent said one end thereof in abutting engagement with said first formation such that hammer blows are transmitted to said elongated member longitudinally thereof and through the area of engagement of said first and second formations, said bore having an axial extent such that the end thereof remote from said one end of said elongated member is in spaced relationship with the working end of said drill bit when said first and second formations are in abutting engagement with each other, said elongated member including a special hammering formation at the other end thereof and adapted to perform a special hammering function upon operation of said power hammer, whereby said special hammering function may be brought about without removing said drill bit from the power hammer.

2. The attachment according to claim 1 wherein said first formation is an integral part of the hammering mechanism of said power hammer.

3. The attachment according to claim 2 wherein said integral part is a tappet which projects from said nose of the power hammer.

4. The attachment according to claim 1 wherein said first formation is an annular shoulder formed on said drill bit.

5. The attachment according to claim 1 wherein said second formation is defined by an annular shoulder at said one end of said elongated member.

6. The attachment according to claim 1 further defined by retaining means thereon adapted for releasably mounting said attachment on said drill bit with said first and second formations in abutting engagement with each other.

7. The attachment according to claim 6 wherein said retaining means is defined by a ball received within a cavity formed in the wall of said elongated member and communicating both with said bore and the exterior surface of said elongated member, said cavity defining an opening in the wall of said bore having a diameter less than the diameter of said ball and sufficiently large to allow a portion of the ball to project into said bore and into a recess formed in said drill bit, and resilient means fastened to said elongated member and engaged with said ball thereby urging the latter inwardly for releasably retaining said ball portion within said recess on the drill bit.

8. The attachment according to claim 7 wherein said resilient means comprises an annular member mounted on said elongated member and formed of elastic material, said annular member engaging another portion of said ball for urging the latter inwardly of said cavity.

9. The attachment according to claim 8 wherein said annular member is in the form of a sleeve which also serves as a gripping member for said attachment.

10. The attachment according to claim 1 wherein said special hammering formation is in the form of a bluntend cylinder adapted to drive anchor slugs into concrete anchor sleeves.

11. The attachment according to claim 10 further defined by the provision of a forwardly facing, annular shoulder on said elongated member in coaxial relationship therewith and in longitudinally spaced relationship with said blunt-end, said annular shoulder being arranged for engagement with the outer end of a cylindrical concrete anchor.

12. The attachment according to claim 1 wherein said special hammering formation is in the form of a chisel.

13. The attachment according to claim 1 wherein the hammer blows are transmitted to said attachment only through the area of engagement of said first and second formations.

14. The attachment according to claim 1 wherein said bore is a blind bore.

15. In combination, a power hammer and an associated drill bit, said hammer being of the type including a powered hammering mechanism, said hammer having a nose portion and an adjacent opening to receive the shank portion of said drill bit when the latter is operatively attached to the power hammer, a first formation adjacent said nose portion and accessible from the exterior of said power hammer, said first formation being connected with said hammering mechanism such that the former receives impact blows developed by the latter, an attachment comprising an elongated member having a longitudinally extending bore communicating with at least one end of said member and receiving said drill bit, said elongated member having a second formation adjacent said one end thereof and being in abutting engagement with said first formation such that hammer blows are transmitted to said elongated member longitudinally thereof and through the area of engagement of said first and second formations, said bore having an axial extent such that the end thereof remote from said one end of said elongated member is in spaced relationship with the working end of said drill bit when said first and second formations are in abutting engagement with each other, said attachment including retaining means releasably mounting said attachment on said drill bit with said first and second formations in abutting engagement with each other, said elongated member including a special hammering formation at the other end thereof and adapted to perform a special hammering function upon operation of said power hammer, whereby said special hammering function may be brought about without removing said drill bit from the power hammer.

16. The combination according to claim 15 wherein said power hammer is of the rotary type including a rotary mechanism and selector means for alternately establishing rotary and hammering modes of movement for said drill bit.

* * * * *